(12) United States Patent
Johnson et al.

(10) Patent No.: US 10,855,205 B2
(45) Date of Patent: Dec. 1, 2020

(54) TRIBOELECTRIC ENERGY GENERATOR

(71) Applicant: KONINKLIJKE PHILIPS N.V., Eindhoven (NL)

(72) Inventors: Mark Thomas Johnson, Eindhoven (NL); Lutz Christian Gerhardt, Eindhoven (NL); Steven Ernest Franklin, Eindhoven (NL); Alan James Davie, Cambridge (GB); Neil Francis Joye, Waalre (NL); Andrew Ulrich Rutgers, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 487 days.

(21) Appl. No.: 15/562,924

(22) PCT Filed: Mar. 24, 2016

(86) PCT No.: PCT/EP2016/056493
§ 371 (c)(1),
(2) Date: Sep. 29, 2017

(87) PCT Pub. No.: WO2016/156180
PCT Pub. Date: Oct. 6, 2016

(65) Prior Publication Data
US 2018/0091064 A1    Mar. 29, 2018

(30) Foreign Application Priority Data

Mar. 31, 2015  (EP) ..................................... 15161948

(51) Int. Cl.
*H02N 1/04*  (2006.01)
*H02N 1/10*  (2006.01)
*H02N 1/00*  (2006.01)

(52) U.S. Cl.
CPC ................ *H02N 1/04* (2013.01); *H02N 1/002* (2013.01); *H02N 1/10* (2013.01)

(58) Field of Classification Search
CPC ............. H02N 1/04; H02N 1/002; H02N 1/10
(Continued)

(56) References Cited

U.S. PATENT DOCUMENTS

| 2008/0087544 A1* | 4/2008 | Zhou ...................... G01N 27/48 204/406 |
| 2014/0246950 A1* | 9/2014 | Wang ....................... H02N 1/04 310/310 |
| 2014/0246951 A1 | 9/2014 | Wang et al. |

FOREIGN PATENT DOCUMENTS

CN         203933440 U    11/2014

OTHER PUBLICATIONS

Yang, et al., "3D Stack Integrated Triboelectric Nanogenerator for Harvesting Vibration Energy", Advanced Functional Materials, 2014, pp. 1-7.
(Continued)

*Primary Examiner* — Derek J Rosenau

(57) ABSTRACT

The invention provides an energy generation and/or conversion system and method wherein an electrical power generator is controlled to periodically alternate between a contact-mode, during which elements of the generator are brought into contact to induce a state of charging, and a non-contact mode, during which plates of the generator are separated from one another and electrical energy is generated through electrostatic induction. Timing and duration of contact and non-contact modes are controlled by a controller, or by user commands, in dependence on a charge state of the elements of the generator: In this way elements are controlled to come into contact only when surface charge has fallen below a certain level, and re-charging is necessary; contact time between the elements may hence be
(Continued)

minimised—thereby minimising incurred noise and surface wear—whilst still maintaining a given desired threshold power output.

15 Claims, 4 Drawing Sheets

(58) Field of Classification Search
 USPC .................................................. 310/310, 339
 See application file for complete search history.

(56) References Cited

OTHER PUBLICATIONS

Wei, et al.,"Surface-charge engineering for high-performance triboelectric nanogenerator based on identical electrification materials", ScienceDirect, Nano Energy 2014, 10, pp. 83-89.

Lin, et al., "Noncontact Free-Rotating Disk Triboelectric Nanogenerator as a Sustainable Energy Havester and Self-Powered Mechanical Sensor", ACS Applied Materials & Interfaces, vol. 6, No. 4, Feb. 26, 2014, pp. 3031-3038.

* cited by examiner

TRIBOELECTRIC ENERGY GENERATOR

CROSS-REFERENCE TO PRIOR APPLICATIONS

This application is the U.S. National Phase application under 35 U.S.C. § 371 of International Application No. PCT/EP2016/056493, filed on Mar. 24, 2016, which claims the benefit of European Application Serial No. 15161948.3, filed Mar. 31, 2015. These applications are hereby incorporated by reference herein, for all purposes.

FIELD OF THE INVENTION

The invention relates to an energy generation and/or conversion system for converting mechanical energy into electrical energy.

BACKGROUND OF THE INVENTION

One example of such a system, whereby mechanical energy may be converted into electrical energy, is a triboelectric energy generation system. The triboelectric effect (also known as triboelectric charging) is a contact-induced electrification in which a material becomes electrically charged after it is contacted with a different material through friction. Triboelectric generation is based on converting mechanical energy into electrical energy through methods which couple the triboelectric effect with electrostatic induction. It has been proposed to make use of triboelectric generation to power wearable devices such as sensors and smartphones by capturing the otherwise wasted mechanical energy from such sources as walking, random body motions, the wind blowing, vibration or ocean waves (see, for example: Wang, Sihong, Long Lin, and Zhong Lin Wang. "Triboelectric nanogenerators as self-powered active sensors." *Nano Energy* 11 (2015): 436-462).

The triboelectric effect is based on a series that ranks various materials according to their tendency to gain electrons (become negatively charged) or lose electrons (become positively charged). This series is for example disclosed in A. F. Diaz and R. M. Felix-Navarro, A semi-quantitative tribo-electric series for polymeric materials: the influence of chemical structure and properties, Journal of Electrostatics 62 (2004) 277-290. The best combinations of materials to create static electricity are one from the positive charge list and one from the negative charge list (e.g. PolyTetraFluoroEthylene (PTFE) against copper, or fluorinated ethylene propylene (FEP) against aluminium). Rubbing glass with fur, or a comb through the hair are well-known examples from everyday life of triboelectricity.

In its simplest form, a triboelectric generator uses two sheets of dissimilar materials, one an electron donor, the other an electron acceptor. When the materials are brought into contact, electrons are exchanged from one material to the other. This is simply the triboelectric effect. If the sheets are then separated, each sheet holds an electrical charge (of differing polarity), isolated by the gap between them, and an electric potential is built up. If an electrical load is connected between electrodes placed at the backside of the two material surfaces, any further displacement of the sheets, either laterally or perpendicularly, will induce in response a current flow between the two electrodes. This is simply an example of electrostatic induction. As the distance between the respective charge centres of the two plates is increased, so the attractive electric field between the two, across the gap, weakens, resulting in an increased potential difference between the two outer electrodes, as electrical attraction of charge via the load begins to overcome the electrostatic attractive force across the gap.

In this way, triboelectric generators convert mechanical energy into electrical energy through a coupling between two main physical mechanisms: contact electrification (tribo-charging) and electrostatic induction.

By cyclically increasing and decreasing the mutual separation between the charge centres of the plates, so current can be induced to flow back and forth between the plates in response, thereby generating an alternating current across the load. The power output can be increased by applying micron-scale patterns to the polymer sheets. The patterning effectively increases the contact area and thereby increases the effectiveness of the charge transfer.

Recently, an emerging technology for power generation (energy harvesting) and power conversion has been developed which makes use of this effect, as disclosed in Wang, Z. L, "Triboelectric nanogenerators as new energy technology for self-powered systems and as active mechanical and chemical sensors." *ACS nano* 7.11 (2013): 9533-9557. Based on this effect several device configurations have been developed of so-called triboelectric nanogenerators ("TENG"). Since their first reporting in 2012, the output power density of TENGs has been greatly improved. The volume power density may reach more than 400 kilowatts per cubic metre, and an efficiency of ~60% has been demonstrated (ibid.). In addition to high output performance, TENG technology carries numerous other advantages, such as low production cost, high reliability and robustness, and low environmental impact. The TENG may be used as an electrical power generator, i.e. energy harvesting from, for example, vibration, wind, water, random body motions or even conversion of mechanically available power into electricity.

TENGs may broadly be divided into four main operational classes one of which operates in a so called linear sliding mode, wherein charged plates are induced to slide laterally with respect to one another in order to change the area of overlap between them. A potential difference is induced across the plates, having an instantaneous magnitude in proportion to the rate of change of the total overlapping area. By repeatedly bringing plates into and out of mutual overlap with one another, an alternating current may be established across a load connected between the plates.

One particular subset of linear sliding mode TENGs are rotational disk TENGs which can be operated in both a contact (i.e., continuous tribocharging and electrostatic induction) or a non-contact mode (i.e., only electrostatic induction after initial contact electrification). Rotational disc TENGs typically consist of at least one rotor and one stator each formed as a set of spaced circle sectors (segments). The sectors overlap and then separate as the two discs rotate relative to each other. As described above, a current may be induced between two laterally sliding—oppositely charged—layers, with a magnitude in proportion to the rate of change of the area of overlap. As each consecutively spaced sector of the rotor comes into and then out of overlap with a given stator sector, so a current is induced between the two sector plates, initially in a first direction, as the plates increase in overlap, and then in the opposite direction as the plates decrease in overlap.

The limitations of early versions of segmentally structured disc TENGs (Long Lin et al., Segmentally Structured Disk Triboelectric Nanogenerator for Harvesting Rotational Mechanical Energy, Nano Lett., 2013, 13 (6), pp 2916-2923) were that the rotational and stationary triboelectric layers require deposition of metal electrodes and connection with electrical leads, leading to inconvenient operation of the rotational part.

A disk TENG with both groups of patterned electrodes attached onto a stationary disk, together with a freestanding triboelectric layer on a rotational disk can resolve these issues, as disclosed in Long Lin et al., Noncontact Free-Rotating Disk Triboelectric Nanogenerator as a Sustainable Energy Harvester and Self-Powered Mechanical Sensor. ACS Appl. Mater. Interfaces, 2014, 6 (4), pp 3031-3038. With such a structure, there is no necessity for electrode deposition or electrical connection for the rotational part, which dramatically improves the operating facility of the energy harvester.

Rotational disk TENGs, and indeed linear sliding mode TENGs in general, can be operated in both a contact mode and a non-contact mode. Although contact is desired to tribo-charge the plates (both initially and also subsequently, to counteract leakage) the electrostatic induction process itself (by means of which the electrical energy is generated) does not require contact between the plates, but operates well with a small plate separation (of, for example, approximately 0.5 mm).

Operating in a contact mode—wherein the plates are maintained in continual fictive contact—results in a higher power output, since the plates are being continually charged, and hence continually maintained at some theoretical maximal charge capacity (defined by the capacitance of the bi-plate system) by continual replacement of charge lost through leakage etc. The greater the charge which can be maintained on the plates, the greater the electrostatic inductive output which can be generated, since naturally a greater charge density induces a greater electrostatic force between electrons in the plates.

However, operating in contact mode brings with it various difficulties, including excess noise production and deterioration of device materials through surface abrasion as well as power loss due to having to overcome the friction between the plates.

SUMMARY OF THE INVENTION

It is an object of the invention to inter alia reduce one or more of the aforementioned difficulties. This object is achieved with the invention as defined in the independent claims. The dependent claims provide advantageous embodiments.

The invention thus provides an electric power generation system and method with which it is possible to increase or optimise power output while the effects associated with one of the above difficulties is reduced. This is achieved by a mode of operation of the device wherein there is a power generation mode wherein there is no contact between the mutually moving elements carrying charge for generating the electrical power and a charging mode wherein there is contact between the moving elements in order to replenish any charge lost during the power generation mode.

Depending on the speed with which charge leaks away in the power generation mode, the charging mode may be reduced in time therewith increasing the effect of reducing any of the effects associated with any of the difficulties.

The modes can be operated intermittently over time, to periodically recharge the movable parts. The invention thus allows power output to be maintained at or above a certain desired threshold, for the realising of a particular desired output capacity for example, by periodically recharging, while avoiding or mitigating the noise and/or surface wear problems associated with running a generator in contact mode.

In the invention power generation means generation of a power signal. Such a power signal is a voltage signal or a current signal as is usual to define for electrical power.

The state of charging existing between the two elements may mean that just one of the first element and second element comprises an electrical charge, or, that both comprise unequal electrical charge of the same polarity. It may be preferred that both comprise substantially the same electrical charge but of opposite polarity. Any state of charging that can result in (is responsible for) a power output of the electrical power generator upon mutual motion of the elements will work with the invention.

The electrical power generator may comprise a triboelectric power generator, wherein the first and second elements comprise first and second triboelectric generator plates. In the these examples, the invention may thus provide a system for triboelectric generation wherein the operating mode of the generator may be switched intermittently between a contact mode, during which one or both of the plates are tribo-charged, and a non-contact mode, during which energy is generated (or converted) through electrostatic induction. In this case, altering the state of charging comprises increasing the state of charging. However, in other example embodiments, altering the state of charging may comprise decreasing a state of charging.

The controller may control the timing and/or duration of the charging mode (contact phase) and power generating mode (non-contact phase). The controlling is in dependence of a detected state of charging of the plates. To this end the system, for example through the controller, can output state of charging information for use in controlling the two modes of operation (can be manually). Also, or alternatively, the system can use this charge state information directly to control the timing and/or duration of the operating modes. In either or both ways, when the charge on the plates falls below a certain threshold, the charging mode can be effectuated. For example, the controller may automatically or user instigated control the drive mechanism to bring the plates into contact, thereby initiating a contact-mode (or charging-mode phase). The charging mode can have a fixed period, or can be stopped once the charge on the plates has once again exceeded a particular threshold. For example, the controller automatically or user instigated may control the driver to separate the two plates, thus initiating a non-contact (or energy generation) mode. This process of intermittently operating the system in power mode and charging mode may be repeated continually, with contact periodically made and then broken between the plates, in dependence upon the charge state of the plates.

The timing of the two operating modes (contact and non-contact) may be optimised, so as to ensure the maintenance of a particular minimum plate charge, for the realising of a particular desired output capacity for example, while minimising the total contact time between the plates. In this way noise and surface wear may be minimised while ensuring that output load does not fall below a desired minimum level. Thus within a timespan comprising at least one power generation mode period and a (subsequent) charging mode period (or vice versa), the charging period preferably occupies a percentage of the time span equal to or less than 50%, 40%, 30%, 20%, 10%, 10%, 5%, 1%, 0.1%. The lower the percentage the better any of the effects of the difficulties can be reduced. The percentage can be fixed per timespan, but can also be adjustable between or during operation of the system. If the charging state is measured periodically, then the mode periods and the mode starting and/or stop times can be adjusted periodically based on the last measured charging state.

The system comprises a device for determining the state of charging. The controller may comprise a comparator circuit for receiving an output load voltage of the generator. The output power and output voltage of a TENG generator, for example, will reduce as the charge of the plates leaks away in the (non-contact phase) period following a (tribo) charging process. Hence, the state of the charge may be assessed by monitoring the output signal (either the output voltage, current or the output power) as a function of time. Therefore, a comparator circuit may be used to compare instantaneous output power signal with some reference value, for example, and generate an output signal in response.

The comparator circuit may comprise a Schmitt-trigger circuit for example. The Schmitt-trigger circuit may be adapted to trigger a new charging phase in response to the generator output signal (voltage, current or power) dropping below a given first (lower) threshold level, and to subsequently terminate the charging phase in response to generator output signal (voltage, current or power) rising above a given second (upper) threshold level.

To accommodate the movability of the first and second element, they can be configured to be rotatable with respect to each other with a relative speed of rotation around an imaginary axis of rotation. The first and second elements may comprise first and second disk elements, rotatable with respect to one another. Thus, there may be an imaginary axis of rotation around which at least one of the elements rotates. In this case the electrical generator may comprise a rotational disk TENG wherein first and second elements (i.e. plates) have surfaces that face each other. The surfaces can carry the charge for creating the charging states. The elements may, for example, consist of (at least) one rotor and one stator each formed as a set of spaced sectors of a circle.

In certain examples of the previous paragraph, the drive mechanism may comprise a mechanism that is configured for generating and/or maintaining a distance between the first element and the second element, where the distance can be measured along the imaginary axis of rotation. Preferably this mechanism is further configured for generating and/or maintaining the distance by being further configured such that the distance is dependent on the relative rotation of the first element and the second element. In particular the first element and the second element can have one or more spiral-patterned topographical features formed on surface(s) of the first disk element (26) and/or the second disk element (28). The spiral patterned topographical features are for generating a distance that can be measured along the imaginary axis. The hydrodynamic lift between the first and second elements, in response to rotation, As the disks are rotated relative to one-another, a pumping action in the fluid (environment wherein the discs are placed (gaseous atmosphere or liquid) is generated such that plates are pushed apart with the magnitude of the force being related to the relative speed of rotation. If the disks are, for example, subject to some small pre-load force pushing the plates towards each other—for example the weight of the top plate if the plates are aligned horizontally—then an increase in the speed of rotation will result in a proportional increase in the separation between the plates. A subsequent slowing of the disks results in a consequent narrowing of the spacing between the disk elements. The force for pushing the plates closer towards each other can also be arranged by spring type fixtures such as with rubber bands, mechanical springs, electromechanical means magnetic means etc.

The invention can thus be used as a system for conversion of mechanical energy into electrical energy. Hence it can be used as an energy scavenging device. Alternatively, or indeed according to any of the above embodiments, the system may further comprise a motor unit for generating relative motion between the first and second elements. In this way the system is capable of for example transferring electrical energy generated in one part by the motor to another part remote from the motor location. This may enable the availability of electrical power at locations for which motors are too big and/or other ways of providing are electrical power are not suitable. In examples, the motor unit may be powered by one or more of a variety of energy sources, such as combustion, electricity, batteries, fuel cells, nuclear power or any other suitable power source. The controller may in this case comprise a motor controller circuit, connected to the motor unit, for controlling a drive input voltage to the motor unit. In this way, the relative speed of the disk elements, and hence the separation between the elements, may be precisely controlled by the system, for example, in response to a drop or rise in output voltage of the generator. In some cases, for example, the controller comprises a comparator circuit, and the output signal of the comparator circuit may connect to an input of the motor control circuit, such that the motor speed can be triggered to adjust between different values in response to the falling or increasing of the generator output voltage/power below or above certain thresholds.

In other examples however, a motor unit for generating relative motion between the plates of the generator may not be provided in conjunction with the spiral bearing driver mechanism. Although the separation between the plates must be controlled in this case by controlling the speed of rotation, the primary motor driver of the generator may comprise some external mechanical source (e.g. wind or water turbine etc), and additional mechatronic components additionally utilised to limit or constrain the external source where necessary by providing a resistance for example. In this way the speed might be varied between a maximum (when no mechanical resistance is applied to the external motor source) and a minimum (when maximal resistance force is applied against the motor source).

According to this or any other embodiment, the driver mechanism may comprise one or more mechatronic actuation elements. These may include, by way of non-limiting example, stepper motors, motor driven screws, controlled electromagnets, or hydraulic or pneumatic shutters or valves. These may or may not be used in conjunction with a provided motor unit for driving the motion of the plates, and may or may not be used in conjunction with the spiral bearing embodiment described above. Is some cases, for example, no spiral bearing is provided and plates are simply controlled to come into and out of contact through the use of mechatronic actuator elements alone. This may be used in conjunction with an external source of physical energy such as wind or water, or may be used in conjunction with a provided motor unit.

The controller may, in these cases comprise a mechatronic actuation control circuit, for example in signal communication with the controller. The mechatronic action control circuit is for controlling the mechatronic actuation unit.

The controller may comprise a user input module, for receiving commands from a user. The commands can be for defining one or more of: start time, stop time, period of the charging mode and/or the power generation mode, the upper threshold of the power output signal, the lower threshold of the power output signal, the lower threshold of the charging state or the upper threshold of the charging state. The controller may be adapted to control the timing and/or duration of the contact and non-contact phases in response to said commands from a user. The user input module may be provided in conjunction with one or more of the 'automated' control embodiments described above, for example to provide a 'manual override' functionality, whereby a user may intervene in an otherwise automatically regulating system to force the system to adopt a particular operating mode at a particular time. Alternatively, the system may be entirely manually controlled, such that the drive mechanism is controlled entirely in response to manual commands received from a user.

In these or any other example embodiments, the controller may comprise a user-output module for outputting to a user information for use in manually controlling the timing and/or duration of the charging mode. Hence the controller may provide simply an interface between the system and a user, enabling a user to decide when the system switches between contact and non-contact mode, by for example communicating information relating to the charge state of the plates or of the output voltage/power of the generator.

According to the invention, there is also provided a method of operating an electrical power generator (24, 52) for generating electrical power. Features defined for the system can also be used for modification of the method and advantages defined for the system therewith also apply to the modified method.

In embodiments of the method, the first and second elements may be brought into contact in response to a dropping of an output voltage of the generator from above a lower threshold to below said lower threshold, and wherein first and second elements are brought out of contact in response to a rising of an output voltage of the generator from below an upper threshold, to above said upper threshold.

The first and second elements may be brought into and/or out of contact by means of a mechatronic control element, such as, by way of non-limiting example, a stepper motor, motor driven screw, controlled electromagnet, or hydraulic or pneumatic shutters or valves.

In some embodiments, the first and second elements may comprise first and second disk elements, rotatable with respect to one another, and at least one of said disk elements comprising spiral-patterned topographical features. In this case, first and second elements may be brought into and/or out of contact with one another by varying a relative speed of rotation between the two elements, to thereby generate a variable hydrodynamic lift force between the two elements.

BRIEF DESCRIPTION OF THE DRAWINGS

Examples of the invention will now be described in detail with reference to the accompanying schematic drawings, in which.

DETAILED DESCRIPTION OF THE EMBODIMENTS

Figure 1:
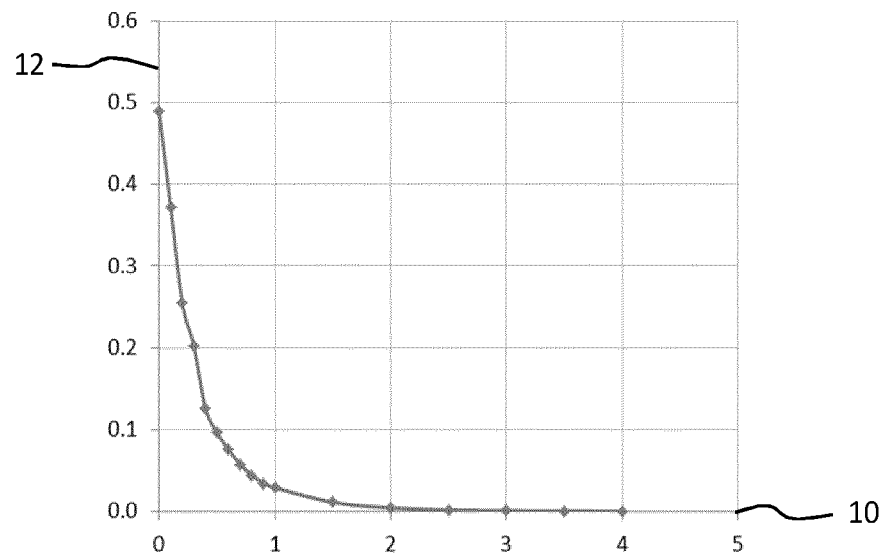
FIG. 1 shows a graph illustrating the relationship between peak power output and plate separation for an example rotating disk triboelectric generator.

The invention provides an energy generation and/or conversion system and method wherein an electrical power generator is controlled to periodically alternate between a contact-mode, during which elements of the generator are brought into contact to induce a state of charging, and a non-contact mode, during which elements of the generator are separated from one another and electrical energy is generated through electrostatic induction. Timing and duration of contact and non-contact modes are controlled by a controller, or by user commands, in dependence upon a charge state of the elements of the generator: In this way elements are controlled to come into contact only when surface charge has fallen below a certain level, and charging is necessary; contact time between the elements may hence be minimised—thereby minimising incurred noise and surface wear—whilst still maintaining a given desired threshold power output.

According to one particular set of embodiments, the electrical generator may comprise a triboelectric generator, wherein a combination of the triboelectric effect and electrostatic induction are exploited in order to harvest or convert mechanical energy into electrical energy. In particular examples described below, embodiments of systems are described comprising triboelectric generator elements in particular.

Tribo-electric generators can operate in a non-contact mode but provide higher power output if they also exploit intimate contact for tribocharging. However, operating in a contact mode results in issues with noise and device lifetime (surface wear).

Embodiments of the present invention propose a solution, wherein a generator is operated in a periodic or repeated contact mode. Embodiments provide operation modes of triboelectric generators with periodic but temporarily short contact of the triboelectric materials. The rate of the repeated/periodic contact may be controlled in relation to the rate of charge leakage/loss of the surfaces. In addition, driving mechanisms and feedback approaches may be provided to limit the contact charging frequency (by determining when surface charge has been lost) and duration (by indicating when sufficient contact has been made) and hence maximise the non-contact energy generation period at a maximum power level. The example embodiments of driving systems and methods disclosed below are described in particular in relation to a rotating disc and reciprocating sliding plate tribo-electric generators. However, these particular examples are to be understood as purely illustrative and exemplary, and it will be understood by one skilled in the art that the methods and systems described are applicable to all types of triboelectric generator.

Rotating disc tribo-electric generators require an intermittent, intimate contact for tribocharging (charge transfer) but then ideally operate in a non-contact mode to overcome issues with noise, friction and device life-time. Mechanisms for establishing a non-contact mode (i.e. rotor-stator separation) and for subsequently controlling the gap height between the plates precisely are therefore two key challenges in realising a periodic contact operating mode. Precise control of gap height is particularly important since plate separation distance has a significant impact on the generated triboelectric voltage and power output.

In FIG. 1 is shown a graph illustrating a measured relationship between plate separation in mm (x-axis 10) and peak power output in mW (y-axis 12) for an example rotating plate TENG comprising a PTFE rotor. As discussed above, power output is greatest when the plates are in contact (i.e zero plate separation), reaching a peak output for the example rotor measured for FIG. 1 of approximately 0.5 mW. As plate separation is increased, peak power output falls extremely sharply, with a separation of just 0.5 mm incurring a near 80% output reduction, peak power falling to just 0.1 mW. At a separation of 2 mm, power output has fallen to almost zero.

Figure 2:
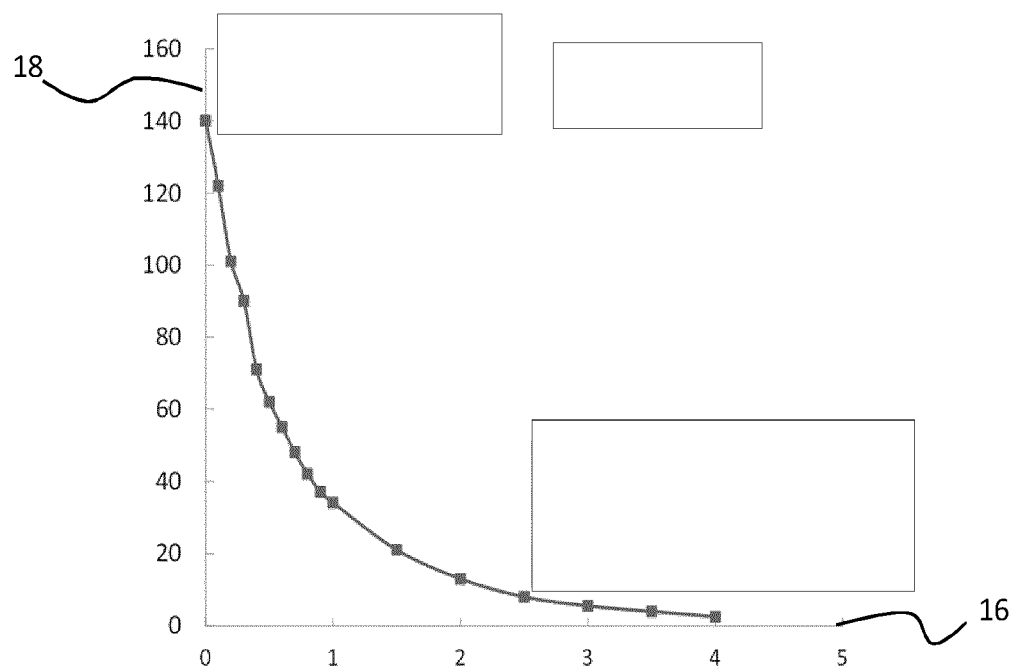
FIG. 2 shows a graph illustrating the relationship between peak-to-peak output voltage and plate separation for an example rotating disk triboelectric generator.

Similarly, FIG. 2 illustrates the relationship, for the same example TENG, between plate separation in mm (x-axis 16) and peak-to-peak amplitude of the output voltage in V (y-axis 18). Once again, a sharp decline is observed in response to increased plate separation, with a gap of 0.5 mm incurring a reduction in peak-to-peak voltage of approximately 75% (from ~140V to ~35V).

Hence, for efficient functioning, drive mechanisms are desired for bringing the plates into and out of separation which are capable of delivering highly precise control over the separation distance between the plates.

According to a simple first embodiment of an energy conversion system in accordance with the invention, the system comprises a TENG device, having plates with an adjustable relative displacement, one or more mechatronic control elements for actuating the adjustment and/or fixing of the plates' relative displacement, and one or more controller elements for controlling the mechatronic control elements in response to a determined charge level or state of the plates.

Figure 3:
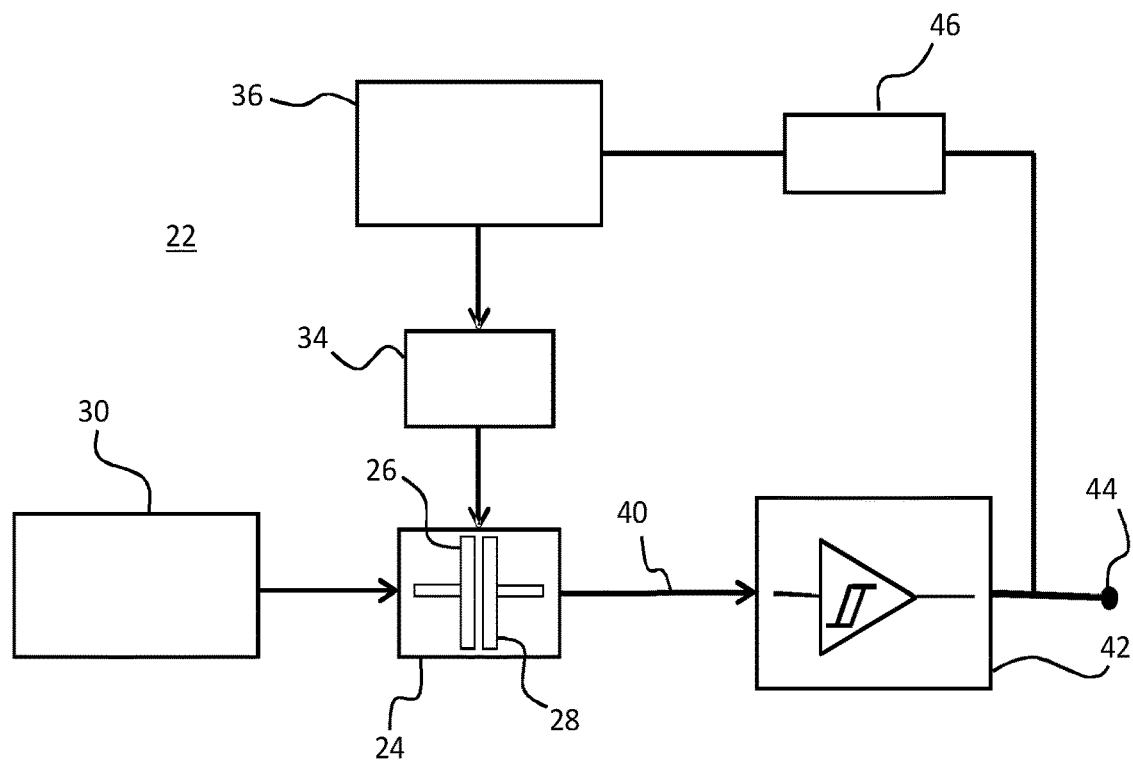
FIG. 3 shows a block diagram of an example arrangement for a first example energy generation and/or conversion system, comprising a triboelectric generator.

FIG. 3 shows a block diagram of one example arrangement for this system. In this example, a rotating disk TENG 24 is shown for illustrative purposes, but it will be understood by those skilled in the art that the arrangement may equally be applied to other varieties of TENG (as discussed in previous sections). The rotor 26 of the TENG 24 is operatively coupled with a mechanical output of a mechanical driving mechanism 30. The driving mechanism provides the input source of kinetic or motor energy, which is to be converted by the system into electrical energy.

In some particular examples, a rotating disk TENG may be used wherein the stator 28 comprises a series of disposed (conductive) electrodes, while the rotor comprises a freestanding layer of dielectric (non-metallic) material. According to this arrangement, the only disk carrying a charge is the dielectric stator layer, which confers the particular advantage that capacitance between the plates is kept constant. In addition (as discussed in Long Lin et al., Noncontact Free-Rotating Disk Triboelectric Nanogenerator as a Sustainable Energy Harvester and Self-Powered Mechanical Sensor. ACS Appl. Mater. Interfaces, 2014, 6 (4), pp 3031-3038), with such a structure, there is no necessity for electrode deposition or electrical connection for the rotational part, which dramatically improves the operating facility of the generator.

The driving mechanism (or motor energy source) 30 may in some embodiments comprise an 'external' source, such as for example a wind or water driven turbine, a vibrational energy source, or human-driven source of motor events. In this case, the system 22 may function as an energy 'harvesting' system, wherein externally generated energy otherwise lost is captured and converted into an electrical energy source. According to alternative embodiments, however, the energy source may comprise a source 'internal' to the system itself, such as for example a motor unit. The motor unit may be powered by various energy sources, such as combustion, electricity, batteries, fuel cells, clockwork springs, gravity, nuclear power etc. In this case, the system 22 may provide simply energy conversion functionality.

Operatively coupled to one or both plates 26, 28 of the TENG 24 is a mechatronic plate-separation driving element 34, which is controlled by mechatronic control circuit 36. In connection with the electrical output 40 of TENG device 24 is a Schmitt-trigger circuit 42, whose output is connected to $V_{out}$ terminal 44, as well as to the signal input of relay switch 46. The Schmitt-trigger circuit 42 acts as controller for system 22, controlling, in concert with relay switch 46, the activation of mechatronic elements 34, 36, and hence the timings and duration of plate contact and non-contact phases. The movement of the plates between contact and non-contact modes is controlled by the Schmitt-trigger circuit 42 in response to generator output voltage 40. For example, Schmitt-trigger circuit may be adapted to assess an initial level of generator output voltage/power, to monitor the reduction in output power/voltage, and switch its output from a high output to a low output in order to indicate that sufficient surface charge has been lost to require initiation of a new tribo-charging phase. In response, relay 46, in connection with Schmitt-trigger circuit output 42, may be correspondingly switched from a high to a low signal output. Mechatronic control circuit 36 may be adapted to respond to the switching of relay 46 from high to low by triggering mechatronic driver element 34 to move the TENG plates 26, 28, into a contact-mode position.

Note that a relay circuit is not essential, so that in some examples, the Schmitt-trigger circuit 42 may be connected directly to the mechatronic control circuit 36, without the requirement for a relay circuit between the two.

In some examples, the output of the Schmitt-trigger circuit 42 may be adapted to switch from high to low—and thereby trigger the initiation by control circuit 36 of a contact-mode phase—in response to output voltage $V_{TENG}$ 40 dropping below a given (first) lower threshold level $V_{lower\_thresh}$. In alternative examples, Schmitt-trigger circuit 42 may be adapted to trigger a contact mode phase in response to a ratio of the (instantaneous) output power or voltage to initial output power or voltage falling below a given threshold level.

Furthermore, once the tribo-charging process has been triggered, the control electronics (i.e. the Schmitt-trigger circuit in this case) may be further adapted to monitor the increase in output voltage/power as the plates charge, and to switch its output from a low output to a high output in order to indicate that sufficient surface charge has been acquired to enable initiation of a new tribo-generation (non-contact) mode phase. In response, relay 46 may be correspondingly switched from a low to a high signal output. Mechatronic control circuit 36 may be adapted to respond to the switching of relay 46 from low to high by triggering mechatronic driver element 34 to move the TENG plates 26, 28, into a non-contact mode (generation mode) position.

By way of non-limiting illustration, the Schmitt-trigger circuit may, according to the above described example, be adapted to generate the following outputs:

$$V_{out} \begin{cases} 0, \text{ if } V_{lower\_thresh} > V_{TENG} \\ 1, \text{ if } V_{upper\_thresh} < V_{TENG} \end{cases}$$

The first condition ($V_{out}=0$) initiates the contact mode, and the second condition ($V_{out}=1$) initiates the non-contact mode.

In this embodiment, the controller controls the drive mechanism to essentially maintain the charge on the plates within a certain defined range of values—between some defined maximum, which when reached during charging, triggers charging to be ended, and some defined minimum which when reached during generation, triggers charging to be initiated. Consequently, power output is similarly maintained within some range of values—between a maximum when charging is maximum and a minimum when charging is minimum. Contact between the plates is restricted only to the minimum required to maintain the threshold charge range.

This range could be defined as relatively small or large. If a relatively small range is defined, charging phases are triggered more frequently, but have shorter duration. Where a large range is defined, charging phases occur less frequently, but have a longer duration each time. These factors may have an influence on surface wear, for example.

Various possibilities exist for the mechatronic plate-separation driving element 34. In some examples, a simple stepper motor may be employed to actuate the movement of the plates between different relative positions. For example, driving element 34 may comprise a stepper motor operatively coupled to just one of the two plates 26, 28. The other plate is maintained in a fixed absolute (axial) position, and the separation between the plates actuated through moving the stepper motor, attached to the first of the plates, between its various steps. Contact and non-contact mode positions may comprise two adjacent steps of the motor, or might be separated by numerous steps of the motor. In alternative examples, plate-separation driving element may comprise a motor-driven screw. Here, a threaded rod (spindle) is threadedly attached to either the rotor, the stator or both. Adjustment of the plate separation may be achieved in this arrangement through utilising a portion of the driving rotational energy source 30 to rotate the plate about the spindle, thereby converting rotational movement into linear movement relative to the rod. A fine thread pitch for example would facilitate very precise adjustment of the plate positioning. Position determination feedback could be achieved by an optical shaft encoder on the spindle for example; and by reversing the motor current of the mechatronic plate-separation driving element, cyclic contact/non-contact mode can be established.

In some examples, a controlled electromagnet may be employed to pull the rotor 26 and stator 28 together. Monitoring the current in the electromagnet may in this case form part of a feedback and control mechanism for mechatronic control circuit 36. For rotors made of non-magnetic materials such as aluminium, a permanent magnet could be used, with the pulling force between the disks generated by eddy currents. Separation distance could then be regulated by the rotational speed of the generator. However, where rotational speed needs to be kept constant in the TENG, or for in embodiments in which rotational speed is not controlled by the system (for example where motor energy source 30 is an external source), a controllable electromagnet may be used.

According to one or more example embodiments, the separation between the plates may be effected by an actuator utilising layers of EAP (electroactive polymer) material, and/or SMM (shape memory material) or any other responsive material capable of mechanical actuation.

In some embodiments, the plate separation mechanism may comprise a pneumatic spring-loaded 'valve', wherein the plates are elastically compressed together (by, for example, a spring), and pressurised air is delivered between the rotor and stator, thereby providing a separation between the plates having a distance proportional or otherwise dependent on the pressure of the delivered air. The reaction force provided by the spring can be used as an automatic reverse mechanism to induce contact mode once the supply of air is stopped or reduced. In accordance with this or other embodiments, shutters or valves, for example hydraulically or pneumatically controlled, may be used to control the flow rate (and hence supplied pressure) of the delivered air.

Figure 4:
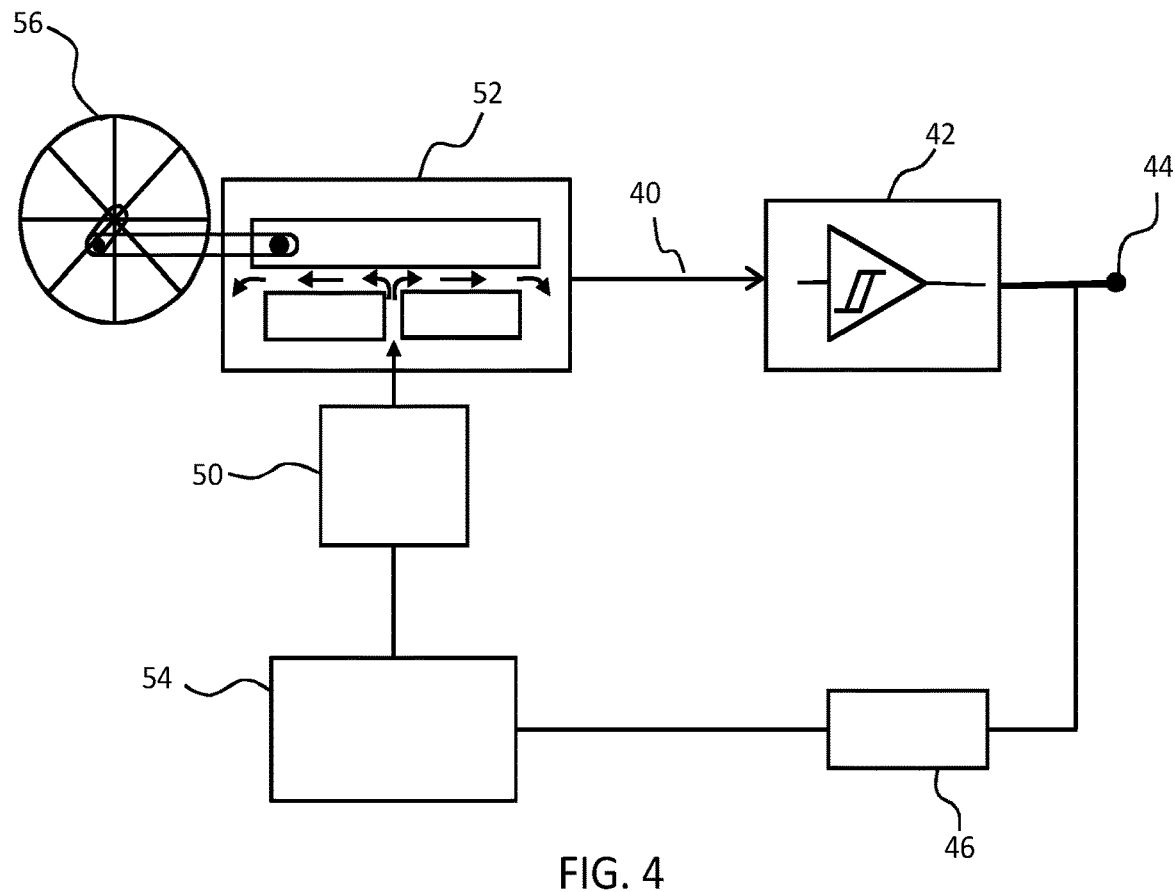
FIG. 4 shows a block diagram of an example arrangement for a second example energy generation and/or conversion system, comprising a triboelectric generator.

FIG. 4 illustrates one example arrangement comprising a pressurised air pneumatic driver mechanism 50 in concert with a reciprocating sliding TENG 52. The pneumatic driver mechanism injects pressurised air between the plates of the TENG thereby providing an air bearing supporting the plates' relative separation against some resisting compressive force (provided for example by a spring or alternatively by gravity). According to this example, lateral sliding motion between the plates is generated by external mechanical driving mechanism 56, comprising a wind or water turbine, co-operatively coupled with an upper (sliding) plate of the TENG 52. As in the example of FIG. 3, a Schmitt-trigger circuit controls the timings and duration of contact and non-contact mode phases in response to the value of the TENG output voltage 40, switching to a low output when a charging (contact) mode is to be initiated, and to a high output when a generating (non-contact) mode is to be initiated. These high and low outputs trigger relay 46 to generate corresponding high and low signal outputs, in response to which pneumatic control element 54 is adapted to control pneumatic driver 50 to vary the pressure/flow rate of injected air between the plates of the TENG between high pressure (non-contact mode) and low pressure (contact mode).

By way of non-limiting illustration, the Schmitt-trigger circuit may, according to the above described example, be adapted to generate the following outputs:

$$V_{out} \begin{cases} 0, \text{ if } V_{lower\_thresh} > V_{TENG} \\ 1, \text{ if } V_{upper\_thresh} < V_{TENG} \end{cases}$$

The first condition ($V_{out}=0$) initiates the contact mode, and the second condition ($V_{out}=1$) initiates the non-contact mode.

In some examples of this arrangement, pneumatic driver element 50 controls the flow rate of air, and hence switches between non-contact and contact modes, by way of a pneumatic valve.

The use of air to provide a bearing for supporting the separation between the plates may be particularly desirable, since this avoids the need for parts making solid mechanical contact with plates to manipulate them. This in turn may avoid or reduce unnecessary wear or material strain, increasing lifetime and/or efficiency of the TENG device and/or driver components. In addition, air bearings may reduce the number of mechanical components within the overall device, eliminating potential sources of faults. Also air bearings may be more energy efficient, since there is little frictional resistance due to mechanical connections between joints/parts.

Figure 5:
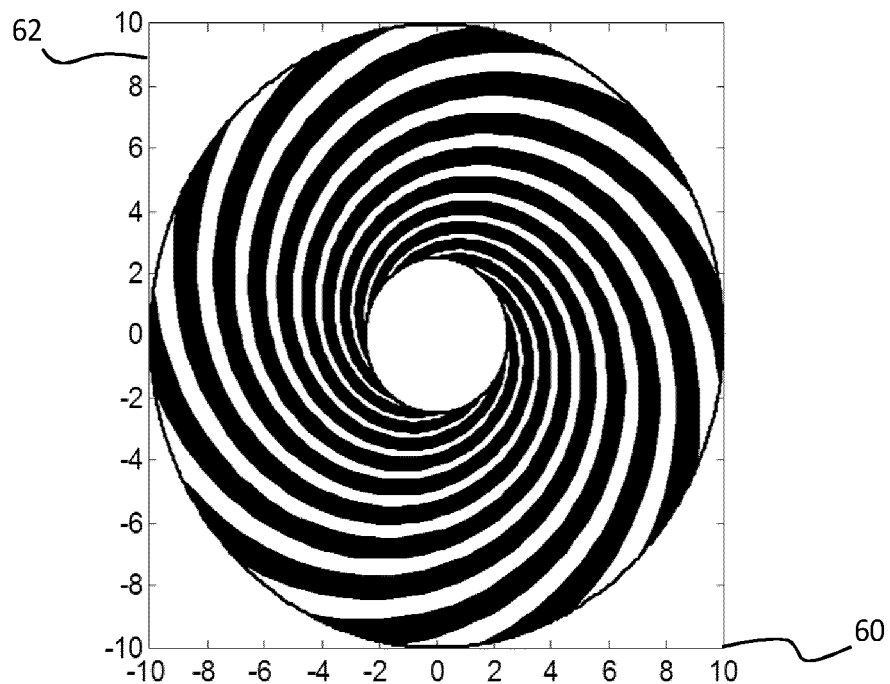
FIG. 5 shows an example spiral patterning for an example rotating disk triboelectric generator comprising a spiral groove thrust bearing.

According to one particular embodiment, a self-regulating thrust bearing for high precision gap control may be provided to the system, through utilising the motion of the plates themselves to generate a source of hydrodynamic lift. According to this example, spiral patterning is provided to the inward-facing surfaces of plates of a rotating disk TENG such that when the plates are rotated, the patterning acts to generate a film of pressurised air in the space between the plates, generating a force which pushes the plates apart. FIG. 5 illustrates one example of a spiral patterning which may be provided to plates of a TENG, wherein the x (60) and y (62) axes represent width and length measurements, in mm, respectively (i.e. denote the diameter of the disks, in mm). The spiral pattern may be imprinted (or engraved, lasered or formed by any other suitable means as will be understood by the skilled person) on the stator, the rotor, or on both.

The magnitude of the generated hydrodynamic force is related to the speed of rotation, so that faster rotating plates induce a greater magnitude of force. The plates may be subjected to some (small) inward bias force pushing the plates together, for example, such that increases and decreases in plate speed—and hence lift force—result in stable increases and decreases in plate separation. In this case, the motion of the TENG plates itself directly drives the inward and outward adjustment of plate separation. Plate separation can be very precisely controlled in this way.

Figure 6:
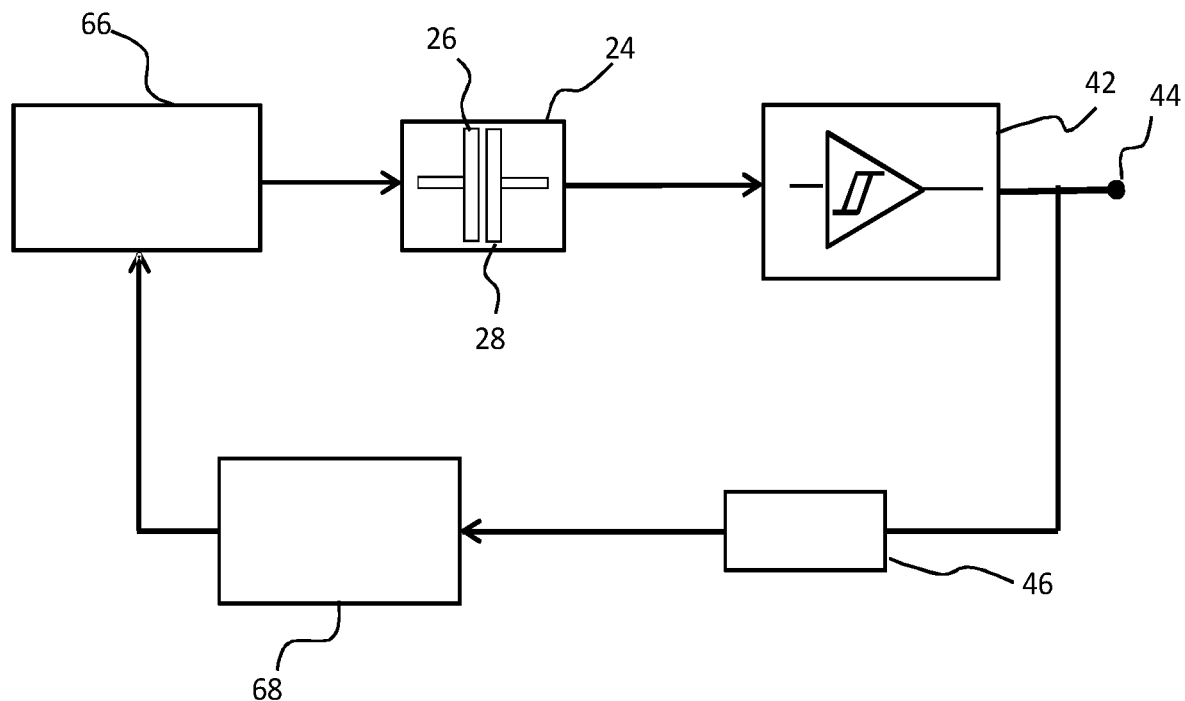
FIG. 6 shows a block diagram of an example arrangement for a third example system, comprising a triboelectric generator.

FIG. 6 shows a block diagram of one example arrangement for a system incorporating the self-regulating spiral air bearing described above.

In this example, the mechanical motion of the rotor disk 26 relative to the stator disk 28 is provided by a motor unit 66, whose speed may be directly controlled at source via motor control circuit 68.

In other examples however, the source of mechanical motion may instead be provided by an 'external' mechanical source, such as for example wind or water—as in the example of FIG. 4. In this case, the speed of the plates cannot be controlled 'at source', but may be controlled through use for example of one or more additional actuation elements which might provide some mechanical resistance against the source motor input to thereby limit the speed of rotation. The maximum speed would in this case still be determined by the motor source, but by selectively applying resistance to the mechanical output of this source, the rate of energy transfer to the TENG can be controlled.

As in the previously described embodiments, the arrangement of FIG. 6 comprises a Schmitt-trigger circuit 42, having an input connected to the output voltage $V_{TENG}$ of the generator 24, and an output connected to an output load terminal 44 and to a relay switch 46. In some examples, the Schmitt-trigger circuit may be adapted to generate a low output in response to determining that the TENG output has fallen below a lower threshold $V_{lower\_thresh}$, and to generate a high output in response to determining that the TENG output has risen to an upper threshold value, $V_{upper\_thresh}$. The motor control circuit 68 may be adapted to respond to a low signal from the relay 46, indicating that a contact (charging) mode phase is to be initiated, by reducing the rpm of the motor unit 66, thereby reducing the lift force between the rotor and stator, and bringing the two plates into contact with one another. Once the charge on the plates has been re-established, and outer voltage once again exceeds $V_{upper\_thresh}$, so Schmitt-trigger circuit 42, via relay 46, triggers motor control circuit 68 to once again increase the rpm of the motor unit, thereby increasing the lift force between the plates, and re-establishing a non-contact mode phase.

In the above described embodiments, the change in an output voltage of the generator is used to determine timings and/or duration of contact (charging) and non-contact (generating) mode phases. Within these, or any other, embodiments of the invention, it may also be desirable for a controller to determine when and whether contact between the plates has been established. This information may be utilised to provide real-time feedback to the driving mechanism mechanically controlling the separation of the plates.

Figure 7:
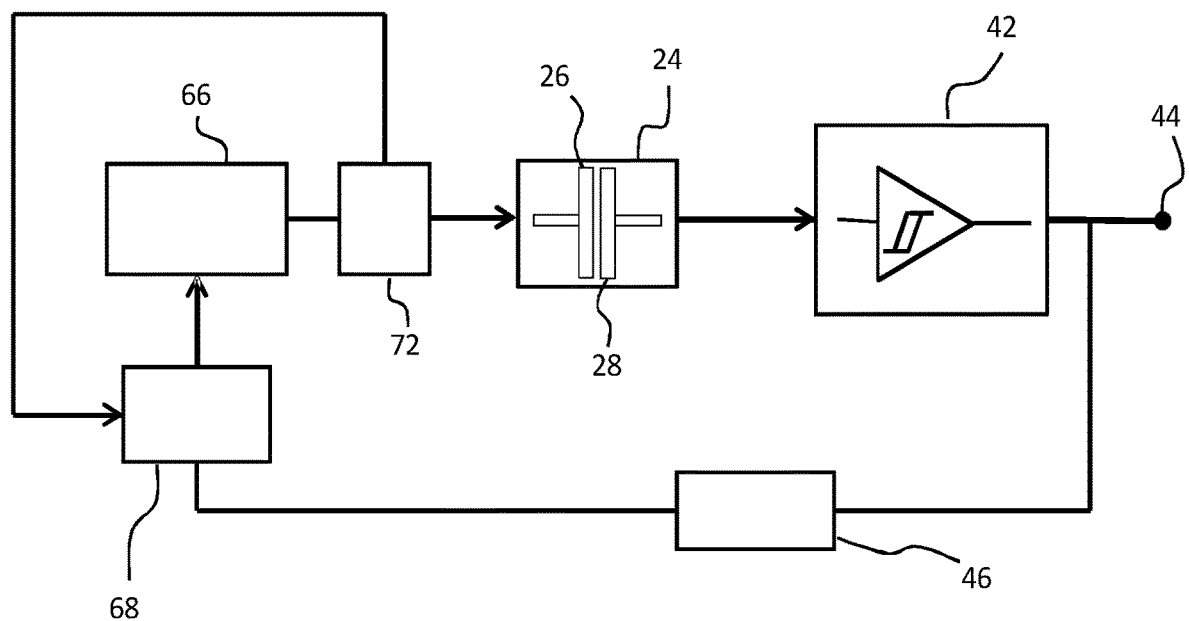
FIG. 7 shows a block diagram of an example arrangement for a fourth example system comprising a triboelectric generator.

Depending on the plate separation driving mechanism, plate contact information may be used by the system in different ways. FIG. 7 shows a block diagram of one example arrangement of a system incorporating a sensor element 72 to determine when and whether contact has been made between plates of a TENG 24. The generator 24 in this case is a rotating plate generator incorporating the spiral air bearing driver of the embodiment described above. In this case, the separation between the plates of the generator is determined by the speed of rotation of motor unit 66. When a contact (charging) mode is to be initiated, motor control circuit 68 slowly reduces the speed of the motor to a level whereby the levitation effect is just removed. Initial contact between the plates may be sensed by sensing element 72, at which point the motor speed rpm may be held constant, thereby maintaining the plates at a minimum amount of contact. This allows tribo-charges to be built up until the upper threshold voltage $V_{upper\_thresh}$ is achieved. At this point, output voltage of Schmitt-trigger circuit 42 switches from low to high, and motor control circuit is triggered by relay 46 to once again begin increasing motor rpm to thereby re-initiate non-contact (generation) mode.

Sensor element 72 in this case does not determine either the timing or duration of contact and non-contact mode phases—this, as in the embodiment of FIG. 6 is determined by Schmitt-trigger circuit 42 (i.e. the system controller), which triggers the motor control circuit to either start decreasing motor speed or to start increasing motor speed in response to the reaching of either a minimum or maximum output voltage threshold respectively. Rather, sensor element 72 merely assists motor control circuit 68 in determining when to stop decreasing motor speed, and hold the motor rpm constant. It is undesirable, in initiating a contact mode, to stop the motor completely, since charging is most efficient when there is some friction between the plates. Hence sensor element 72 enables the motor speed to be reduced to just the right level to bring about stable frictive contact between still-moving plates.

A sensor unit may be incorporated in similar ways within other example embodiments. For example a sensor element might be used within the embodiment of FIG. 3 to provide feedback to mechatronic control circuit 36 in controlling mechatronic element 34. For example, where mechatronic element 34 is an actuator element which exhibits variable actuation (e.g. a stepper motor), a contact sensor may sense when initial contact has been made between the plates of the generator and trigger control circuit 36 to cease actuation at the current step.

Various possibilities exist for the features or mechanism by which sensing of contact between generator elements might be achieved. By way of non-limiting example, sensor element 72 may simply comprise an additional trigger circuit in communication with the voltage output of the generator, and adapted to detect a 'turning point' in voltage output: the point at which generator output ceases to decline, and begins to increase (indicating that contact has been made and charging has begun).

Alternatively a sensing element might for example be adapted to detect a variation of the impedance—and specifically the capacitance—which reaches a given threshold level. A sensor might be an acoustic sensor adapted to detect an acoustic signal resulting from physical contact between the two plates. If applicable, a parameter of the motor driving the TENG might be used as an indicator of surface contact—for example the motor current.

In some cases, the rotation rate of a rotating disk TENG may be measured and used to determine contact. For example, the rotation rate will typically reduce suddenly by some small amount upon contact of the plates (assuming the driving force remains constant) as the surface resistance suddenly increases. This might be measured for example using an accelerometer.

An optical or visual signal might be detected and utilised for determining plate contact, for example a motion or a proximity sensor might be used to detect relative positioning of the plates. Contact might be determined through haptic feedback, for example sensing a vibration as plates make contact. Sensor element 72 might in some cases comprise an axial displacement transducer, or a proximity sensor.

Surface dynamics may be monitored and various parameters used to determine if charging has begun, for example frictional momentum, frictional torque, or surface forces (for example highly sensitive surface force measurements may be used to determine relative surface approach through monitoring attraction and repulsion forces).

In the case of the triboelectric generator driving a resonant load, when the generator starts to generate energy and is coupled to the resonant load, the load frequency will vary. This may be used to indicate that charging has begun.

It may be desirable in some embodiments for the system to comprise further features for enabling determination of the tribo-charging level during a tribo-charging phase, in order to better determine when a tribo-charging phase period can be ended. In the particular embodiments of FIGS. 3, 4, 6 and 7, this is accomplished by the Schmitt-trigger circuit 42 alone. This triggers the initiation of non-contact mode in response to an increase in the output voltage of generator 24, 52 from below to above a pre-determined upper threshold level. Alternatively, a differing comparator circuit may be provided, adapted to determine that a ratio of instantaneous output power or voltage to initial output power or voltage has exceeded a particular upper threshold, to thereby determine that sufficient charging of the surfaces has taken place.

In other embodiments, however, the state of charging may be determined by other means rather than the Schmitt-trigger (or other comparator circuit) as in the examples above.

By way of non-limiting example, embodiments might determine a charging level during charging mode through sensing or measuring frictional heat between the two plates. This could, for example, be measured using a simple thermistor. Alternatively, frictional torque (momentum) generated between the triboelectrically active surfaces might be detected or measured. Alternatively, in the case of a generator driving a resonant load, when the generator frequency matches the resonator frequency, the input current will drop. Observing that the generator frequency approaches the resonator frequency could be used to indicate that the charging is complete.

In these, or any other embodiments, the triboelectric system may comprise a central controller unit adapted to determine, by means of sensor or other input, when a tribocharging is required, and when a tribocharging is completed. This function could be performed by, for example, a computer controller unit, wherein the determining of timings and duration of contact and non-contact mode phases are performed using software.

Example embodiments described above provide a system for regulating and controlling the contact and non-contact mode phases of a tribo-electric generator so as to minimise the overall contact time, and hence contact wear, between the plates, but while keeping the plate charge level (and hence power output/voltage level) from falling below some minimum desired level. According to these examples, a particular range of plate charge levels, and power output levels, is tolerated, with the output cyclically varying between the lower threshold, at which point contact is initiated, and the upper threshold, and which point contact is terminated.

In embodiments, contact and non-contact modes might be triggered in response to variations in a variety of particular plate parameters, these parameters either directly or indirectly linked to a charge state of the plates. For example, the system may comprise a device adapted to monitor one or more of: the Triboelectric voltage of one or both plates (i.e. the potential of the plates), the Triboelectric surface charge density of one or both of the plates, and the electrostatically induced current/charges across or on the plates while in generating (non-contact mode).

In some embodiments, the controlling of timing and/or duration of contact and non-contact phases may be performed in response to or in dependence on user input commands. In this case a controller may be adapted to output information concerning parameters of the system, such as the charge state of the plates, for use in manually controlling the timings and/or duration of the different modes. This output information might be communicated to the user visually or acoustically via a provided display unit, for instance, or through a loud-speaker element. It might alternatively be communicated haptically, via a vibrating control handle or joystick, as one example. Direct user-machine interaction might be enabled via one or more user-feedback elements, such as for example an integrated joystick, wherein 'live' information may be relayed to the user regarding, for example, a charge state or other parameters of the generator, enabling a user to respond directly in providing input control commands for controlling the system.

According to one or more embodiments, the system may provide entirely 'manual' tribo-charging and generation functionality: the timings and/or duration of charging and non-charging mode phases as well as the mechatronic or otherwise controlling of relative separation between plates is entirely controlled by a user via various user input/output elements. Alternatively, the system may provide a 'mixed-mode' functionality, wherein the control of the system is partially automated, and partially (manually) user-controlled. For example, control of the timings and/or duration of contact and non-contact mode phases might be provided manually, selectable in response to user input commands, while the mechatronic or otherwise control/driving of plate separation might be automated. Hence a controller might be adapted to automatically control the initiation or transition from or to either a charging or non-charging mode, in response to certain dedicated user input commands. In this case, the user controls when the mode is changed, but the controller automatically controls the process of physically reconfiguring the plates, for example.

In alternative embodiments still, the system might be switchable between a fully automated operating mode, a fully manual operating mode and/or one or more 'mixed-mode' operating modes. In this way a user may decide to leave the system to automatically self-regulate, or may choose to switch the system to allow or require user control.

The applications for above-described triboelectric energy conversion system embodiments are extremely numerous. In particular, the ability to generate small sources of current for the powering of small components within a device, without the need to provide a dedicated power source, or a supply line to the primary power source of the device, is extremely valuable. Any device which, in the course of its normal operations, either generates or otherwise has access to sources of motor energy, may provide current or voltage to one or component parts through locally positioned TENG generators.

The invention can be used in many power generators especially those that operate in a non-contacting mode and lose charge that is needed for the power generation. Such are indeed TENG generators as known from the below types.

A first mode of operation is a vertical contact-separation mode, in which two or more plates are cyclically brought into or out of contact by an applied force. One example of such a device has been described in the article "Integrated Multilayered Triboelectric Nanogenerator for Harvesting Biomechanical Energy from Human Motions" of Peng Bai et. al. in ACS Nano 2013 7(4), pp 3713-3719. Here, the device comprises a multiple layer structure formed on a zig-zag shaped substrate. The device operates based on surface charge transfer due to contact electrification. When a pressure is applied to the structure, the zig-zag shape is compressed to create contact between the different layers, and the contact is released when the pressure is released.

A design which enables energy to be harvested from sliding motions is disclosed in the article "Freestanding Triboelectric-Layer-Based Nanogenerators for Harvesting Energy from a Moving Object of Human Motion in Contact and Non-Contact Modes" in Adv. Mater. 2014, 26, 2818-2824. A freestanding movable layer slides between a pair of static electrodes. The movable layer may be arranged not to make contact with the static electrodes (i.e. at small spacing above the static electrodes) or it may make sliding contact.

A third mode of operation is a single electrode mode in which one surface is for example grounded—for example, a floor road—and a load is connected between this first surface and ground (see for example Yang, Ya, et al. "Single-electrode-based sliding triboelectric nanogenerator for self-powered displacement vector sensor system."*ACS nano* 7.8 (2013): 7342-7351.) The second surface—not electrically connected to the first—is brought into contact with the first surface and tribocharges it. As the second surface is then moved away from the first, the excess charge in the first surface is driven to ground, providing a current across the load. Hence only a single electrode (on a single layer) is used in this mode of operation to provide an output current.

A fourth mode of operation is a freestanding triboelectric layer mode, which is designed for harvesting energy from an arbitrary moving object to which no electrical connections are made. This object may be a passing car, passing train, or a shoe, for example. (Again, see "Triboelectric nanogenerators as new energy technology for self-powered systems and as active mechanical and chemical sensors." *ACS nano* 7.11 (2013): 9533-9557).

There are still further designs of triboelectric generator, such as a double-arch shaped configuration based on contact electrification. A pressure causes the arches to close to make contact between the arch layers, and the arches returns to the open shape when the pressure is released. A triboelectric nanogenerator has also been proposed which is formed as a harmonic resonator for capturing energy from ambient vibrations.

Other variations to the disclosed embodiments can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A system, comprising:
an electrical power generator for generating an electrical power, the electrical power generator comprising a first element and a second element configured to have a state of charging and configured to be moveable with respect to each other for generating the electrical power when the elements comprise the state of charging, the first element and second element being further configured such that they can be brought into and out of contact with each other;
a drive mechanism for bringing the first element and the second element into and out of contact,
wherein the system is configured to be operated in:
 a charging mode in which the first element and the second element are in contact for altering the state of charging, and
 a power generation mode in which the first element and the second element are out of contact;
wherein the system further comprises:
a device for determining the state of charging; and
a controller for:
 controlling the timing and/or duration of the charging mode in dependence on the state of charging; or
 outputting information for use in controlling the timing and/or duration of the charging mode in dependence on the state of charging.

2. The system as claimed in claim 1, wherein the device for determining the state of charging comprises a comparator circuit for receiving an output signal of the electrical power generator.

3. The system as claimed in claim 2, wherein the comparator circuit comprises a Schmitt-trigger circuit.

4. The system as claimed in claim 1, wherein the first element and the second element comprise a first disk element and a second disk element, rotatable with respect to one another.

5. The system as claimed in claim 1, wherein the first element and the second element are moveable with respect to each other at a moving distance that is fixed at a specific value in the power generation mode.

6. The system as claimed in claim 4, wherein the drive mechanism comprises one or more spiral-patterned topographic features, formed on surface(s) of the first disk element and/or the second disk element, the spiral patterned topographical features for generating a distance between the first and second elements, in response to rotation.

7. The system as claimed in claim 1, further comprising a motor unit for generating relative motion between the first element and the second element.

8. The system as claimed in claim 7, wherein the controller comprises a motor controller circuit, connected to the motor unit, for controlling a drive input voltage to the motor unit.

9. The system as claimed in claim 1, wherein the drive mechanism comprises a mechatronic actuation element.

10. The system as claimed in claim 9, wherein the controller comprises a mechatronic actuation control circuit.

11. The system as claimed in claim 1, wherein the controller comprises a user input module, for receiving commands from a user.

12. The system as claimed in claim 11, wherein the controller comprises a user-output module for outputting to a user information for use in manually controlling the timing and/or duration of the charging mode.

13. A method of operating an electrical power generator for generating electrical power, the electrical power generator comprising a first element and a second element configured to have a state of charging and configured to be moveable with respect to each other for generating the electrical power, the first element and second element being further configured such that they can be brought into and out of contact with each other, the method comprising:
- bringing the first element and the second element into and out of contact, so as to realize a charging mode, wherein the elements are in contact for altering the charging state, and a non-charging mode, wherein the elements are out of contact, and
- controlling the timing and/or duration of the charging in dependence on the state of charging, or

- outputting information for use in controlling the timing and/or duration of the charging mode in dependence on the state of charging.

14. The method as claimed in claim 13, wherein the first element and the second element are brought into contact in response to a dropping of an output voltage of the electrical power generator from above a lower threshold to below said lower threshold, and wherein first and second elements are brought out of contact in response to a rising of an output voltage of the generator from below an upper threshold, to above said upper threshold.

15. The method as claimed in claim 13, wherein the first element and the second element are brought into and/or out of contact by means of a mechatronic control element.

* * * * *